March 24, 1970 A. R. HAMBLEY 3,502,796

CHROMINANCE SIGNAL DEMODULATOR HAVING A COMMON DRIVE CIRCUIT

Filed Aug. 12, 1966

United States Patent Office 3,502,796
Patented Mar. 24, 1970

3,502,796

CHROMINANCE SIGNAL DEMODULATOR HAVING A COMMON DRIVE CIRCUIT

Allan R. Hambley, Schiller Park, Ill., assignor to Hazeltine Research Inc., a corporation of Illinois Filed Aug. 12, 1966, Ser. No. 572,029
Int. Cl. H04n 5/48
U.S. Cl. 178—5.4 3 Claims

ABSTRACT OF THE DISCLOSURE

A chrominance signal demodulator having a pair of amplifier circuits responsive to the chrominance signal, the chrominance signal coupled to the first amplifier being 90° out of phase with respect to the chrominance signal coupled to the second amplifier. A transistor is switched between the cutoff and saturated states for a portion of each cycle of a reference signal having the same phase and frequency as the chrominance signal. The transistor switch causes the first and second amplifiers to be switched between the amplifying and nonconducting states for a portion of each cycle of the chrominance signal providing a different color information signal at the output of each of said amplifier circuits. Alternative arrangements are also covered.

Figure 1:
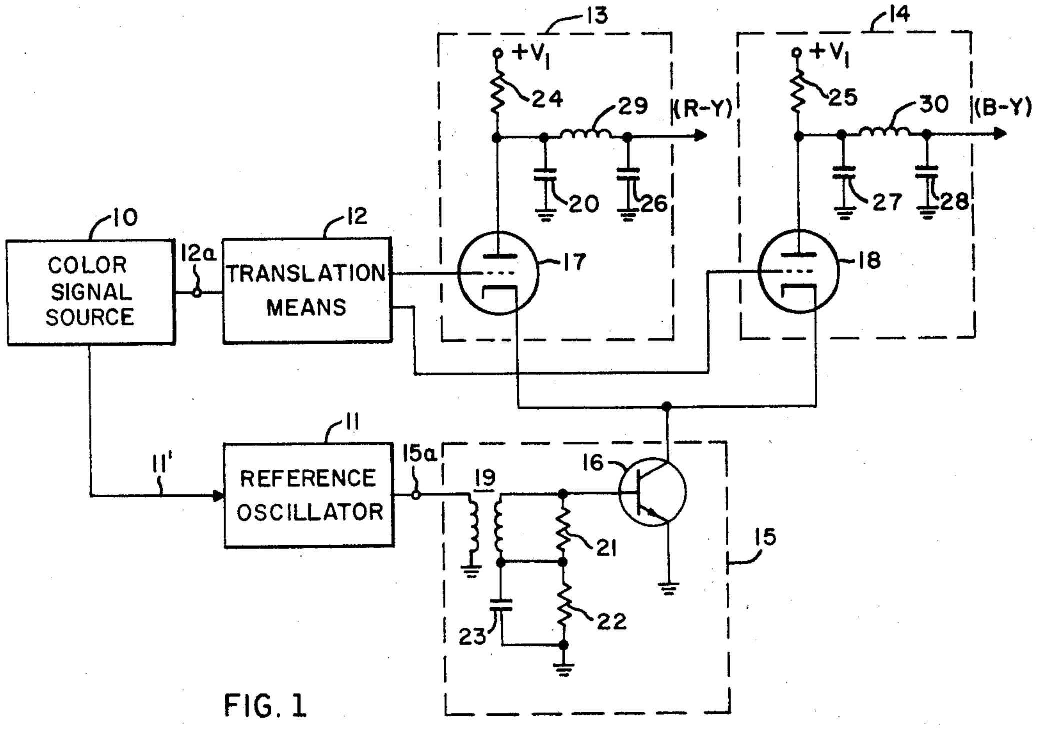

This invention relates to chrominance signal processing in a color television receiver and more particularly, to a chrominance signal demodulator for deriving a plurality of color representative signals, such as (R—Y) and (B—Y) color difference signals, from a modulated chrominance sub-carrier signal, such as that incorporated in a received composite color television signal of the NTSC type.

Most commonly, color representative signals are derived in present television practices by synchronous detection or demodulation, generally at low signal level, and separate amplifier circuits are necessary to raise the signals to the level required for application to the kinescope and to provide the requisite D-C stabilization. Prior attempts at high level demodulation have not been totally satisfactory in that they have still required additional circuitry to achieve D-C stabilization or have lacked adequate D-C stabilization.

The present invention provides a more economical chrominance demodulator by demodulating the chrominance signal at high signal levels, thereby producing video frequency color representative signals which are of sufficient amplitude to be applied directly to the kinescope without requiring further amplification. The novel circuits of the present invention also provide the requisite D-C stability in the demodulator itself, thereby obviating the need for further processing of the derived color representative signals to provide D-C stability.

Objects of the present invention are therefore to provide a new and improved chrominance demodulator for deriving a plurality of color representative signals, from a supplied chrominance signal, achieving one or more of the following: simplicity, economy of construction, outputs of sufficient amplitude that may be applied directly to the kinescope without further amplification and excellent D-C stability.

In accordance with the present invention a circuit for deriving a plurality of color information signals from a carrier signal, comprises a first input terminal for accepting a carrier signal modulated at different phases by color information signals, a second input terminal for accepting a reference signal of the same frequency as the carrier signal and having a predetermined phase relationship to the carrier signal, a plurality of amplifier means capable of being switched between amplifying and nonamplifying states, switching means responsive to the reference signal and coupled to the amplifier means for providing a single set of switching signals for switching each of the amplifier means between amplifying and nonamplifying states during each cycle of the reference signal and translation means for coupling the modulated carrier signal to each of the plurality of amplifier means with the relative phases required to cause each of the amplifier means to amplify different portions of the modulated carrier signal.

For a better understanding of the present invention together with other and further objects thereof, reference is had to the following description taken in conjunction with the accompanying drawings and its scope will be pointed out in the appended claims.

In the drawings:

FIG. 1 is a schematical representation of a circuit constructed in accordance with the present invention.

Figure 2A:
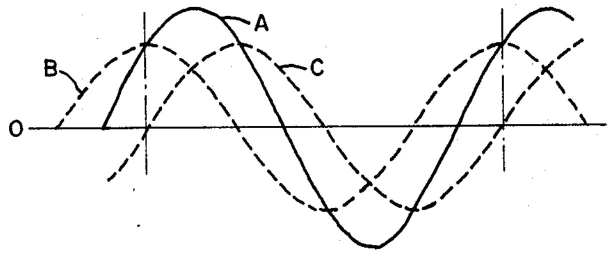

FIG. 2*a* is a graphical representation of a few cycles of a randomly chosen chrominance signal and two of its components, the $(R-Y)$ color difference signal and the $(B-Y)$ color difference signal.

Figure 2B:
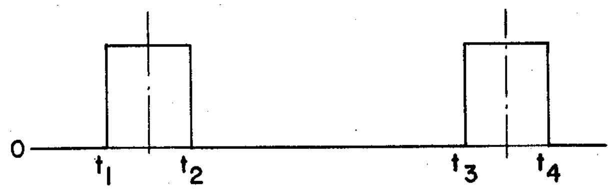

FIG. 2*b* illustrates, in idealized form, the no signal variation of the plate current of tube 17 produced by the application of the reference signal to transistor 16.

Figure 2C:
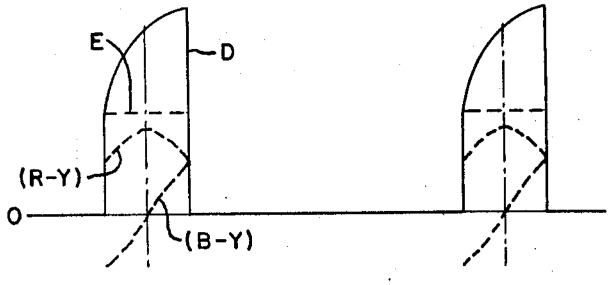

FIG. 2*c* represents the demodulator plate current waveform that is produced by the application of the FIG. 2*a* chrominance signal to the grid of tube 17.

FIG. 1 is a schematical representation of one example of a circuit for deriving a plurality of color information signals, such as the $(R-Y)$ and $(B-Y)$ color difference signals, from a carrier signal, such as the chrominance sub-carrier signal in the NTSC composite color television signal. The apparatus includes input terminal 12*a* for accepting a carrier signal modulated at different phases by color information signals, coupled thereto from color signal source 10. In the NTSC type receiver the chrominance subcarrier signal coupled to terminal 12*a* from color signal source 10 has a $(R-Y)$ color difference component which has a 90° phase displacement with respect to the color burst signal (which may be supressed by the color signal source 10) and a $(B-Y)$ color difference component which has a 180° phase displacement with respect to the color burst signal. The color signal source 10 may include circuits for receiving a composite television signal and for processing it and to that end may include one or more stages of chrominance amplification, a burst detector, a burst amplifier, and a phase and color killer detector.

The FIG. 1 circuit also includes input terminal **15*a* for accepting a reference signal of the same frequency as the carrier signal and having a predetermined phase relationship to the carrier signal. In the NTSC system the color burst signal consists of a few cycles of a sine wave having the same frequency as the chrominance subcarrier wave, approximately 3.58 megacycles, and having a predetermined phase relationship to the chrominance information signals modulated on the chrominance subcarrier. A reference for demodulating the chrominance signal can therefore be provided by supplying a periodic signal, such as coupled from the reference oscillator 11 to terminal 15*a*, which has the same frequency and a fixed phase relationship with respect to the color burst signal. Techniques for synchronizing the reference oscillator 11 to the color burst information are well known in the art. The connection 11′ from the color signal source 10** represents the application of the required burst information to the reference oscillator to achieve the desired synchronization.

The FIG. 1 embodiment further includes a plurality of amplifier means, shown as first and second gated amplifiers 13 and 14 which are capable of being switched between amplifying and nonamplifying states and means 15 for providing a single set of switching signals for switching each of said amplifiers between amplifying and nonamplifying states during each cycle of said reference signal. As shown, switching means 15 includes transistor 16 which is responsive to the reference signal supplied by reference oscillator 11. Transistor 16 is arranged or biased so that it is saturated by the reference signal during a first predetermined portion of each cycle of the reference signal for causing amplifier circuits 13 and 14 to be placed in the amplifying state by providing a substantially short circuit impedance path from amplifier circuits 13 and 14 to ground. Transistor 16 is arranged so that it is rendered nonconductive by said reference signal during a second predetermined portion of each cycle of the reference signal for causing amplifier circuits 13 and 14 to be placed in the nonamplifying state by providing a high impedance path from amplifier circuits 13 and 14 to ground.

The circuits of FIG. 1 also includes translation means 12 for coupling the modulated carrier signal to each of said plurality of amplifiers, 13 and 14, for causing each of said amplifier circuits to amplify different portions of said modulated carrier signal. In the circuit shown, the signal is coupled from input terminal 12*a* to amplifier 13 with no substantial phase displacement and to amplifier 14 with an approximately 90° phase displacement. In this manner, each of the amplifiers, 13 and 14, provides a different one of the color difference signals.

It is most common in present practice to derive two color difference signals directly from the chrominance signal and then matrix these derived signals to produce a third color difference signal. However, with the development of less expensive active elements such as through integrated circuits and related methods it may be equally or more economical to derive the three color difference signals directly from the chrominance signal. In that event, the present invention would provide a third amplifier, responsive to the chrominance subcarrier signal having a specific phase displacement with respect to the chrominance signal coupled to amplifiers 13 and 14, to derive a third color difference signal.

OPERATION

The FIG. 1 embodiment derives the two color difference signals from the chrominance signal by sampling the chrominance signal at the proper time and for the proper duration. The explanation of how the FIG. 1 embodiment achieves this result is simplified by discussion of the waveforms shown in FIG. 2.

Waveform A in FIG. 2*a* illustrates a few cycles of a randomly chosen chrominance signal that might be coupled to the grid of triode 17 of amplifier 13 by translation means 12. As previously stated, the manner in which this chrominance signal is developed at the transmitter, transmitted, received, detected, and processed prior to being coupled to the translation means 12 is well known in the art and does not constitute part of the present invention. No matter how the signal is developed at the transmitter, the composite chrominance signal A may be considered to be composed of two color difference signals, $(R-Y)$ and $(B-Y)$ which have a 90° phase displacement and which are represented by waveforms B and C, respectively. The chrominance signal coupled to the grid of triode 18 of amplifier 14 is similar to that coupled to amplifier 13 except it is phase shifted 90° by translation means 12. Therefore, the $(B-Y)$ component of the chrominance signal coupled to amplifier 14 is in phase with the $(R-Y)$ component coupled to amplifier 13. The signals coupled to amplifiers 13 and 14 by translation means 12 may also have different amplitudes in order to provide the required differential gains of the $(R-Y)$ and $(B-Y)$ signals. It is also possible to have the amplitudes of these signals to be equal and provide different gains in the amplifier circuits 13 and 14 but that arrangement is more likely to produce a color shift with D-C drifts in the amplifiers.

By regulating the conduction of each of these amplifiers so that they only conduct for a predetermined portion of each cycle of the reference signal $(R-Y)$ and $(B-Y)$ color difference signals are developed in the plate circuits of amplifiers 13 and 14, respectively.

Transistor 16 serves to regulate the conduction state of amplifiers 13 and 14 in response to the periodically varying signal coupled to the base of transistor 16 from reference oscillator 11 by transformer 19. The reference oscillator 11 is controlled by an indication derived from the color burst signal in well known manner so that it has the same frequency (3.58 megacycles) and a 90° phase displacement with respect to the color burst signal coupled to the grid of triode 17 (if not suppressed). The signal coupled to the base of transistor 16 therefore has the same frequency as the color subcarrier and is in phase with the $(R-Y)$ color difference component of the chrominance signal coupled to amplifier 13 and the $(B-Y)$ color difference component of the chrominance signal coupled to amplifier 14. The periodic variations of the reference signal causes the transistor 16 to be saturated during a portion of each cycle and to be cut off during another portion of each cycle. During the saturation period of the transistor 16, the cathodes of tubes 17 and 18 are brought nearly to ground potential, allowing tubes 17 and 18 to amplify signals present at their respective grids. When the transistor is cut off and it presents a very large impedance to tubes 17 and 18 and effectively prevents conduction and amplification on and by tubes 17 and 18.

For the purpose of more fully describing the operation of the FIG. 1 embodiment the derivation of the (R—Y) color difference signal will be explained in greater detail. It will readily be understood that at the same time as the $(R-Y)$ signal is developed in the plate circuit of amplifier 13, the $(B-Y)$ color difference signal is developed in the plate circuit of amplifier 14.

FIG. 2*b* illustrates, in idealized form, the variation produced in the plate current of tube 17 when no signal is applied to the grid and the reference signal is applied to transistor 16. The intervals from $t_1$ to $t_2$ and $t_3$ to $t_4$ are the saturation periods of transistor 16 while the interval from $t_2$ to $t_3$ is the period which transistor 16 is cutoff by the reference signal. It was assumed in drawing this idealized waveform that capacitance 20 is large enough to minimize the 3.58 megacycle voltage component at the plate.

When the FIG. 2*a* chrominance signal is applied to the grid of triode 17 it modulates the plate current which flows during the saturation period of the transistor 16 as illustrated by FIG. 2*c*. The $(R-Y)$ and $(B-Y)$ components of the plate current waveform are also shown so that it may be more readily understood how the $(R-Y)$ color difference signal is produced.

For demodulation along the $(R-Y)$ axis maximum demodulation occurs when the centers of the saturation periods of the transistor 16 coincide with the crest of the $(R-Y)$ component of the signal. The cathode voltage is nearly zero during the saturation period of the transistor 16 because the collector to ground impedance is very small; during the remaining portion of the cycle the transistor 16 presents a large impedance to the cathode. Thus, the triode 17 is turned on for a brief period $t_1$ to $t_2$, centered on the crest of the $(R-Y)$ component of the signal. It is non-conductive during the remaining portion of the cycle, $t_2$ to $t_3$. The resulting plate current pulse is shown in FIG. 2*c*. The total plate current illustrated by waveform D is the sum of the quiescent current, illustrated by dotted line E, the current due to the $(B-Y)$ quadrature component of the signal, and the current to the in phase $(R-Y)$ component. As illustrated, the current due to the $(B-Y)$ quadrature component has equal additive and subtractive parts for linear tube characteristics and results in no change in the average plate current. The current due to the in phase $(R-Y)$ component results in a change in average plate current which is proportional to the amplitude of that component and therefore produces a $(R-Y)$ color difference signal voltage across the load impedance.

This mode of operation provides excellent D-C stability in the plate circuit of tube 17. During the conduction period of transistor 16 the cathode of tube 17 is maintained very close to zero potential and since the transistor 17 is saturated, moderate fluctuations in the reference signal amplitude do not effect the cathode potential. Furthermore the use of transistor circuit 15 as a common switching circuit for both amplifiers 13 and 14 provides that variations in the characteristics of switching circuit 15 have a corresponding effect on the $(R-Y)$ and $(B-Y)$ outputs.

The choice of circuit values involves certain design construction and compromises. For example, the choice of the biasing elements, R22 and C23 in transistor circuit 15 determines the saturation period or sampling angle. A larger sampling angle, such as 180°, is desirable from the viewpoint of maximizing the gain in the demodulation process. However, with large sampling angle any nonlinearity of tubes 17 and 18 causes an undesirable quadrature component (cross-talk) to be produced in the particular color signal developed. It has been determined that a 90° sampling angle is a reasonable compromise producing sufficient gain with a minimum amount of cross-talk. Elements C20 and R24 in the plate circuit are chosen to provide the required bandwidth and to set the quiescent plate voltage at the center of the linear range as determined from the plate characteristics of tubes 17 and 18. In selecting transistor 16, its switching characteristics are considered. It must be capable of switching the tube on for approximately one-quarter of the subcarrier cycle and while some delay in turn on and turnoff can be compensated by adjustment of the phase of the reference subcarrier, the transistor should be saturated during most of its on time. Ideally, a switching transistor would be utilized. However, good performance has been obtained from a more economical general purpose silicon transistor.

Although the invention is not limited thereto, the following circuit values have been found suitable in the FIG. 1 demodulator:

Vacuum tube 17—½ 12AZ7A
Vacuum tube 18—½ 12AZ7A
Transistor 15—2N3416
Potential +V1—+400 V.
Resistor 21—100 ohms
Resistor 22—3900 ohms
Resistor 24—27 kilohms
Resistor 25—27 kilohms
Capacitor 20—5 picofarads
Capacitor 23—0.47 microfarad
Capacitor 26—19 picofarads
Capacitor 27—5 picofarads
Capacitor 28—19 picofarads
Coil 29—1 millihenry
Coil 30—1 millihenry While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A circuit for deriving a plurality of color information signals from a color television signal, which includes a color subcarrier signal modulated at different phases by color information signals and a color burst signal providing a reference phase for the color subcarrier signal, comprising:

a first input terminal for accepting said color subcarrier signal modulated at different phases by color information signals;

a second input terminal for accepting a periodic reference signal having the same frequency and a predetermined fixed phase relationship with respect to said color burst signal;

first and second amplifier circuits capable of being switched between amplifying and nonamplifying states;

transistor switching means arranged to be saturated by said reference signal during a first predetermined portion of each cycle of said reference signal for causing said amplifier circuits to be placed in the amplifying state by providing a substantially short circuit impedance path from said amplifier circuits to ground and arranged to be rendered nonconductive by said reference signal during a second predetermined portion of each cycle of said reference signal for causing said amplifier circuits to be placed in the nonamplifying state by providing a high impedance path from said amplifier circuits to ground;

and translation means for coupling said color subcarrier signal from said first input terminal to said first amplifier circuit with no substantial phase displacement and to said second amplifier circuit with an approximately 90° phase displacement for causing each of said amplifier circuits to amplify different portions of said modulated carrier signal.

2. A circuit as specified in claim 1 in which the $(R-Y)$ color difference component of the chrominance signal coupled to said first amplifier, by said translation means, is in phase with said reference signal and the $(B-Y)$ color difference component of the chrominance signal coupled to said second amplifier is in phase with said reference signal and said transistor is saturated during an approximate 90° portion of each cycle of the reference signal for providing a $(R-Y)$ color difference signal from said first amplifier and a $(B-Y)$ color difference signal from said second amplifier.

3. Apparatus as specified in claim 2 in which each amplifier includes a vacuum tube having a control grid to which the translated chrominance signal is coupled, a cathode electrode to which the collector of said transistor is directly connected, a plate electrode and a plate load circuit coupled to said plate electrode for developing a voltage which is proportional to the change in the average plate current.

References Cited

UNITED STATES PATENTS

| | | | |
|---|---|---|---|
| 2,736,765 | 2/1956 | Lohman et al. | |
| 2,885,467 | 5/1959 | Schlesinger. | |
| 3,023,271 | 2/1962 | Hansen. | |
| 3,243,707 | 3/1966 | Cottrell | 329—50 |

ROBERT L. GRIFFIN, Primary Examiner

RICHARD MURRAY, Assistant Examiner